United States Patent
Settelmayer

(10) Patent No.: US 10,189,420 B2
(45) Date of Patent: Jan. 29, 2019

(54) VEHICULAR ROOF RACK MOUNTING BRACKET

(71) Applicant: Thule Sweden AB, Hillerstorp (SE)

(72) Inventor: Joseph Settelmayer, McKinleyville, CA (US)

(73) Assignee: Thule Sweden AB, Hillerstorp (SE)

( * ) Notice: Subject to any disclaimer, the term of this patent is extended or adjusted under 35 U.S.C. 154(b) by 619 days.

(21) Appl. No.: 14/815,525

(22) Filed: Jul. 31, 2015

(65) Prior Publication Data

US 2016/0039355 A1    Feb. 11, 2016

Related U.S. Application Data

(60) Provisional application No. 62/033,344, filed on Aug. 5, 2014.

(51) Int. Cl.
*B60R 9/10* (2006.01)
*B60R 9/08* (2006.01)
*B60R 9/042* (2006.01)
*B60R 9/052* (2006.01)

(52) U.S. Cl.
CPC ............... *B60R 9/10* (2013.01); *B60R 9/042* (2013.01); *B60R 9/052* (2013.01); *B60R 9/08* (2013.01)

(58) Field of Classification Search
CPC .. B60R 9/10; B60R 9/052; B60R 9/08; B60R 9/042
USPC .......................... 224/324, 309, 315, 319, 331
See application file for complete search history.

(56) References Cited

U.S. PATENT DOCUMENTS

| | | | | |
|---|---|---|---|---|
| 5,456,396 A | * | 10/1995 | Allen | B60R 9/045 224/309 |
| 5,657,914 A | * | 8/1997 | Stapleton | B60R 9/045 224/309 |
| 6,568,644 B2 | * | 5/2003 | Pedersen | B62J 7/08 224/309 |
| 6,793,186 B2 | * | 9/2004 | Pedersen | B60R 9/048 224/309 |
| 9,266,478 B2 | * | 2/2016 | Patel | B60R 9/045 |
| 9,283,884 B2 | * | 3/2016 | Sautter | B60R 9/052 |
| 2003/0075651 A1 | * | 4/2003 | Pedersen | B60R 9/048 248/229.13 |
| 2006/0086766 A1 | * | 4/2006 | Settelmayer | B60R 9/048 224/323 |
| 2011/0290836 A1 | * | 12/2011 | Shen | B60R 9/045 224/319 |
| 2015/0028072 A1 | * | 1/2015 | Patel | B60R 9/045 224/319 |
| 2015/0191127 A1 | * | 7/2015 | Sautter | B60R 9/08 224/331 |

* cited by examiner

*Primary Examiner* — Nathan J Newhouse
*Assistant Examiner* — Lester L Vanterpool
(74) *Attorney, Agent, or Firm* — Sterne, Kessler, Goldstein & Fox P.L.L.C.

(57) ABSTRACT

A vehicular roof rack mounting bracket configured to be secured onto load carrier bars of different dimensions is presented. The bracket can include a pair of elongate clamps configured to be coupled to a bicycle fork anchor of a bicycle carrier. Each clamp can have a bar engagement portion configured to abut an exterior of an elongate support bar of a vehicular roof rack in a secured configuration in which each clamp is fastened to the support bar, and each of the pair of clamps can have a lengthwise oriented longitudinal axis such that each longitudinal axis is oriented at an oblique angle relative to the other longitudinal axis.

31 Claims, 7 Drawing Sheets

VEHICULAR ROOF RACK MOUNTING BRACKET

FIELD

The present disclosure relates generally to a vehicular roof rack mounting bracket. More specifically, embodiments within this disclosure relate to a mechanism configured to secure a bicycle to a vehicular mounted load bar by a bicycle anchor; and in some instances, the mechanism is configured to secure a bicycle fork anchor of a bicycle carrier to a vehicular mounted load bar.

BACKGROUND

Safely and conveniently transporting sports equipment is a concern for many sports enthusiasts. For example, canoes, kayaks, and bicycles can be carried on the roof of a vehicle by being attached to one or more load bars of the vehicle's roof rack. Typically, the load bars are oriented essentially horizontally and crosswise to the direction of travel. Clamping devices are sometimes used to attach sport equipment carriers, or portions thereof to the vehicular roof racks.

BRIEF DESCRIPTION OF THE DRAWINGS

Implementations of the present application will now be described, by way of example only, with reference to the attached figures, wherein.

DETAILED DESCRIPTION

Figure 1:
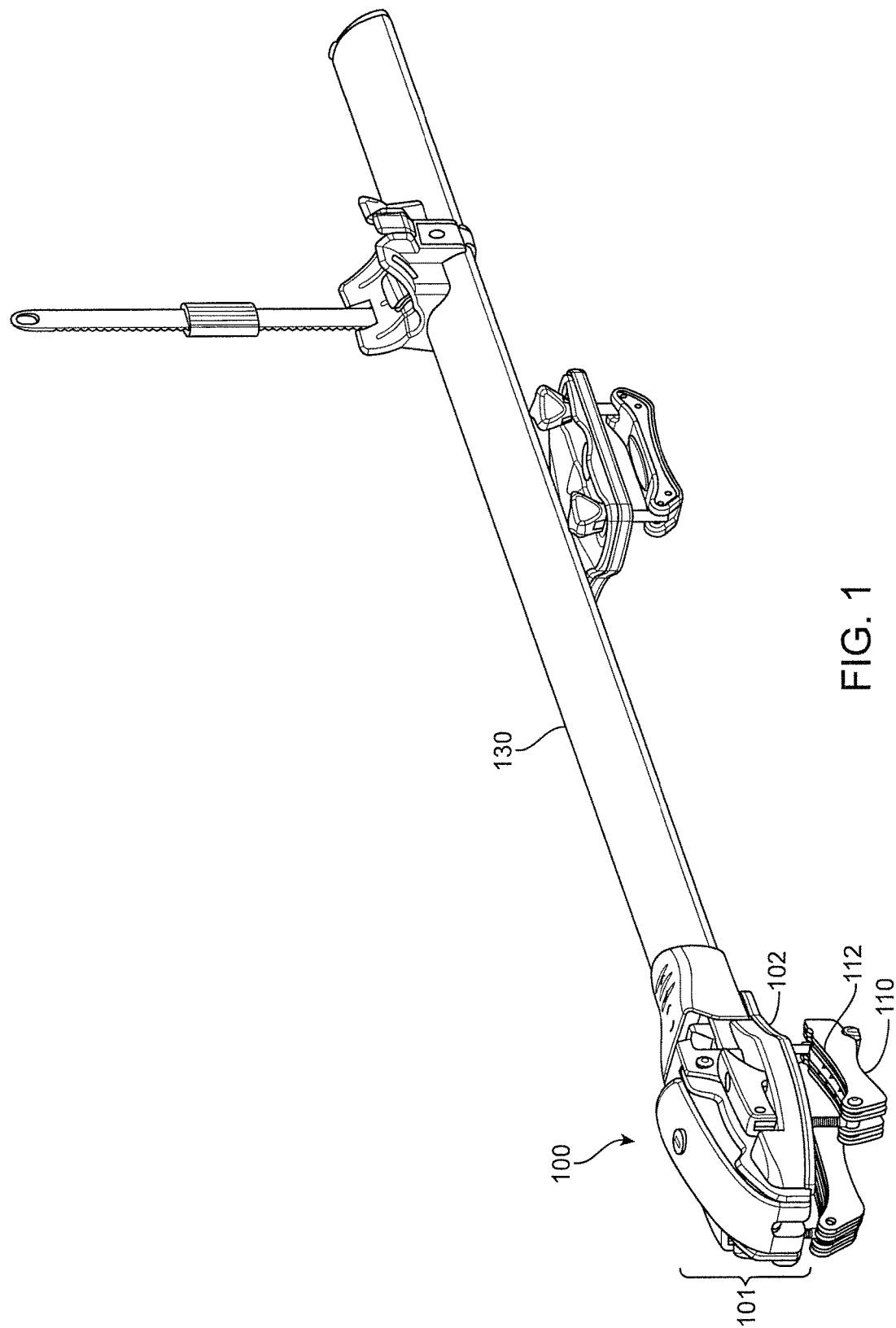
FIG. 1 is an isometric view of an example embodiment of a bicycle carrier having a bicycle fork anchor that includes a bracket assembly having two elongate clamps.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. The description is not to be considered as limiting the scope of the implementations described herein. Descriptions and characteristics of embodiments within this disclosure not mutually exclusive.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder. The terms "comprising," "including" and "having" are used interchangeably in this disclosure. The terms "comprising," "including" and "having" mean to include, but not necessarily be limited to the things so described.

The present technology can be implemented as a vehicular roof rack mounting bracket. The vehicular roof rack mounting bracket is configured to be coupled to a support or load bar on a vehicle. The support bar, also sometimes referred to as a crossbar, can be coupled to the vehicle via feet that are coupled to either a vehicle rail or the vehicle itself. The load bar can be perpendicular relative to the direction of travel of a vehicle. The vehicular roof rack mounting bracket can be implemented as a mounting bracket for a sporting equipment load carrier. For example, the vehicular roof rack mounting bracket can be included as part of a bike mounting mechanism, a kayak carrier or other support equipment load carrier.

The present technology can include one or more of the features described herein. While some features are described in relation to a particular figure, the features can be implemented with other embodiments.

A bracket assembly can be configured to secure a bicycle anchor of a bicycle carrier to an elongate support bar of a vehicular roof rack. The bicycle anchor is configured to releasably receive a part of a bicycle secured thereto. Exemplarily, the bicycle anchor can be a bicycle fork anchor configured to releasably receive a bicycle's fork thereupon. The bracket can include a pair of elongate clamps configured to be coupled to a bicycle fork anchor of a bicycle carrier. Each clamp can have a bar engagement portion configured to abut an exterior of the elongate support bar. In a secured configuration, each clamp can be fastened to the support bar. Each of the pair of clamps can have a lengthwise oriented longitudinal axis and each longitudinal axis can be oriented at an oblique angle relative to the other longitudinal axis. In at least one example, the longitudinal axes of the pair of elongate clamps can be oriented in a substantially V-shaped arrangement.

In at least one example, the angle between the longitudinal axes of the pair of elongate clamps is an acute angle. In another example, the acute angle between the longitudinal axes of the pair of elongate clamps can be greater than 10 degrees. That is, the acute angle between the longitudinal axes of the pair of elongate clamps can be greater than 10 degrees and less than 90 degrees. In yet another example, the acute angle between the longitudinal axes of the pair of elongate clamps can be less than 45 degrees. In another example, the acute angle between the longitudinal axes of the pair of elongate clamps is greater than 10 degrees and less than 45 degrees.

In at least one example, the pair of elongate clamps of the bracket assembly can be orientated in a substantially V-shaped arrangement and each of the pair of elongate clamps can be spaced apart, one from the other. The pair of elongate clamps can further be positioned abreast of one another. That is, substantially on the same level as each other, and neither one ahead of the other.

In at least one example, the pair of elongate clamps can have a front end and a backend, and the front ends of the pair of elongate clamps can be spaced apart from one another at a greater distance than the backends are spaced apart from one another. In another example, the pair of elongate clamps can have a front end and a backend, and the pair of elongate clamps can taper toward one another from the front ends of the pair of elongate clamps to the backends of the pair of elongate clamps. The pair of elongate clamps can further include a brake receiving space located outboard of, and adjacent to the backends of the pair of elongate clamps. In another example, the pair of elongate clamps can further include a pair of brake receiving spaces, each located outboard of, and adjacent to opposite sides of the backends of the pair of elongate clamps.

In another example, a bicycle carrier having a bicycle fork anchor securable to an elongate support bar of a vehicular roof rack is disclosed. The fork anchor can include an anchor body and a pair of elongate clamps coupled to the anchor body. Each clamp can have a generally upwardly facing bar engagement portion configured to abut an exterior of an elongate support bar of a vehicular roof rack in a secured configuration in which each clamp is fastened to the support bar. Each of the pair of clamps can have a lengthwise oriented longitudinal axis and each longitudinal axis can be oriented at an oblique angle relative to the other longitudinal axis.

The anchor body can further include a generally downwardly facing bar engagement portion configured to abut the exterior of the elongate support bar of the vehicular roof rack in the secured configuration in which each clamp is fastened to the support bar.

In at least one example, the longitudinal axes of the pair of elongate clamps can be oriented in a substantially V-shaped arrangement. The angle between the longitudinal axes of the pair of elongate clamps can be an acute angle. In at least one example, the acute angle between the longitudinal axes of the pair of elongate clamps can be greater than 10 degrees. That is, the acute angle between the longitudinal axis of the pair of elongate clamps can be greater than 10 degrees and less than 90 degrees. In another example, the acute angle between the longitudinal axes of the pair of elongate clamps can be less than 45 degrees. In yet another example, the acute angle between the longitudinal axes of the pair of elongate clamps can be greater than 10 degrees and less than 45 degrees.

In at least one example, each of the pair of elongate clamps of the bicycle fork anchor can be orientated in a substantially V-shaped arrangement and can be spaced apart, one from the other. The pair of elongate clamps can further be positioned abreast of the other.

In at least one example, each of the pair of elongate clamps can have a front end and a backend, and the front ends of the pair of elongate clamps can be spaced apart from one another at a greater distance than the backends are spaced apart from one another. In another example, each of the pair of elongate clamps has a front end and a backend, and the pair of elongate clamps taper toward one another from the front ends of the pair of elongate clamps to the backends of the pair of elongate clamps. The bicycle fork anchor can further include a brake receiving space located outboard of, and adjacent to the backends of the pair of elongate clamps. In another example, the bicycle fork anchor can further include a pair of brake receiving spaces, each located outboard of, and adjacent to opposite sides of the backends of the pair of elongate clamps. In any of the examples described above, each of the pair of elongate clamps can be located entirely beneath the anchor body in the secured configuration.

Figure 2:
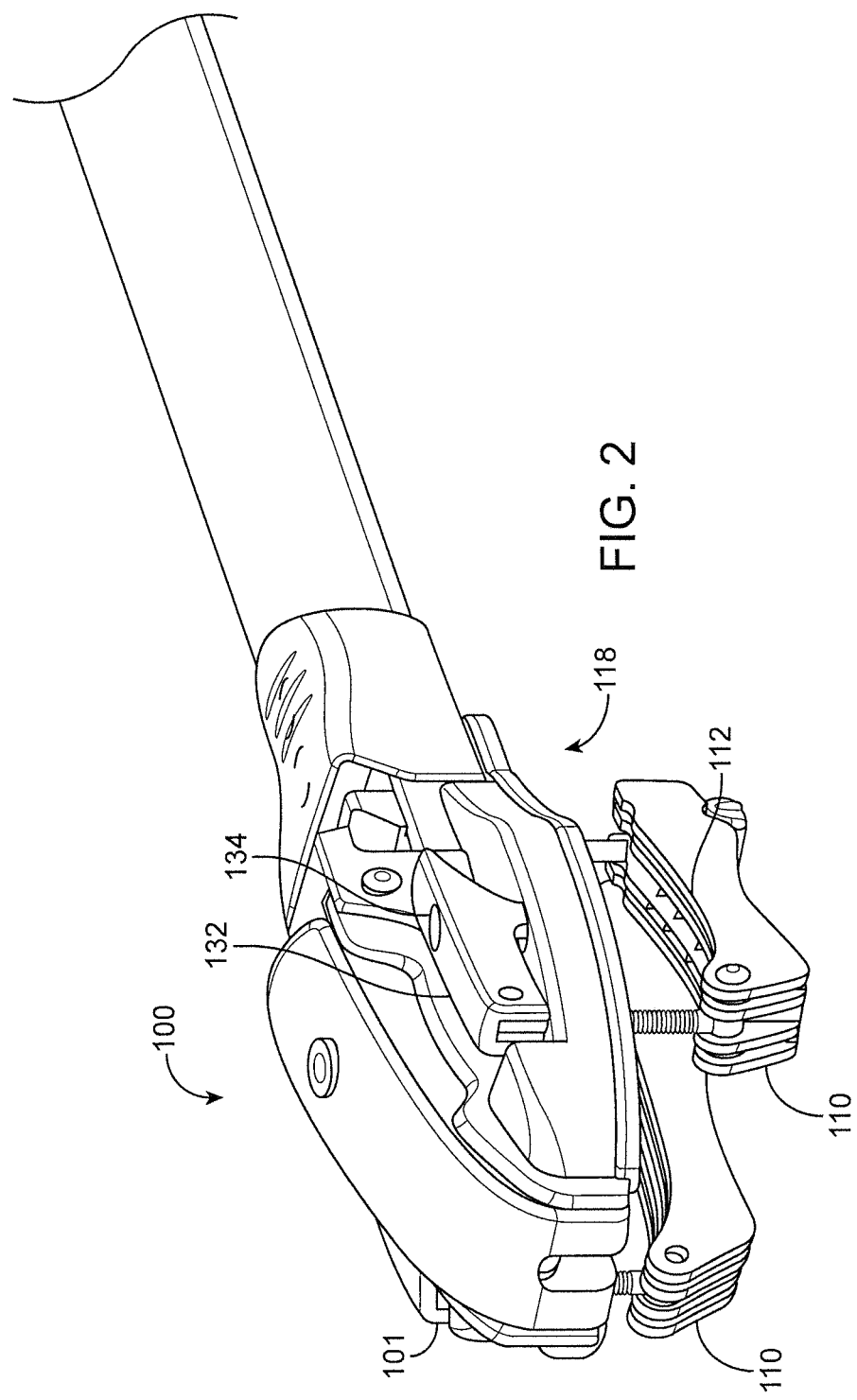
FIG. 2 is an enlarged isometric view of the bicycle fork anchor and bracket assembly of FIG. 1.

FIGS. 1 and 2 illustrate an isometric view of an example embodiment of a vehicular roof rack mounting bracket having two elongate clamps. The bracket assembly 100 includes a pair of elongate clamps 110 and can further include an anchor body 101. The pair of elongate clamps 110 can have an upwardly facing bar engagement portion 112 configured to abut an exterior of an elongate support bar (not shown) of a vehicular rook rack when in a secured configuration. The anchor body 101 can include a downwardly facing bar engagement portion 102 configured to abut the exterior of the elongate support bar in the secured configuration. In the secured configuration, each of the pair of elongate clamps 110 can be fastened to the support bar. The upwardly facing bar engagement portion 112 and the downwardly facing bar engagement portion 102 can include a high friction surface configured to securely engage the elongate support bar. The high friction surface can be integrally molded into the downwardly facing engagement portion 102 of the anchor body 101 and the upwardly facing engagement portion 112 of the elongate clamp 110.

The bracket assembly can be releasably, lockably secured to the elongate support bar utilizing one or more locking handles 132. The locking handles 132 can be configured to, upon pivotation, draw the elongate clamp 110 up, into engagement with the elongate support bar. In at least one example, each of a pair of locking handles 132 is configured to draw tight one of the pair of elongate clamps 110 into engagement with the elongate support bar. In at least one example, the locking handle 132 is oriented in a substantially horizontal configuration above the load bar 130. In a released configuration, the locking handle 132 can be substantially perpendicularly oriented relative to the load bar 130. In at least one example, at least one of the locking handles 132 can include a locking mechanism 134 configured to disable operation of the locking handle 132 when in a locked configuration. In at least one example, the locking mechanism 134 can be a pin tumbler lock using a set of pins to prevent the locking mechanism 134 from opening unless the correct key is used. In another example, the locking mechanism 134 can be a tubular lock.

Figure 3:
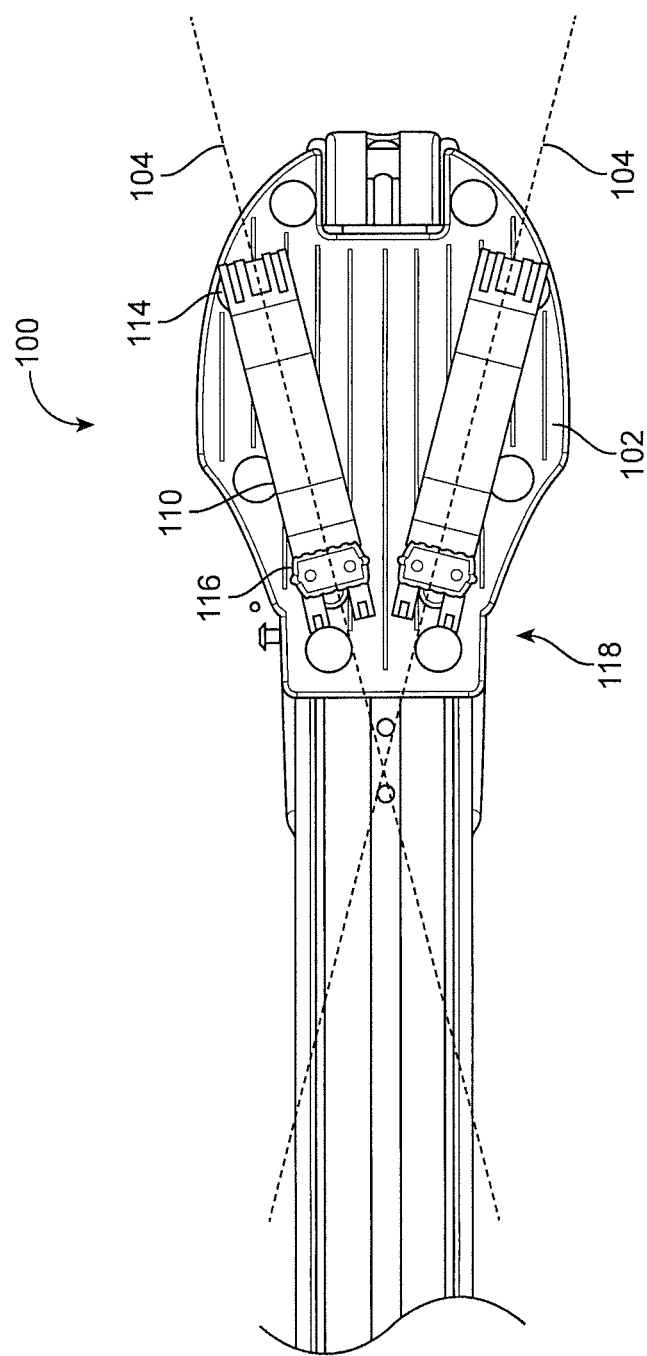
FIG. 3 is a bottom, plan view of the bicycle fork anchor and bracket assembly of FIG. 1.

FIG. 3 illustrates a bottom view of an example embodiment of the vehicular roof rack mounting bracket assembly 100. Each of the pair of elongate clamps can have a lengthwise oriented longitudinal axis 104, and each longitudinal axis 104 can be oriented at an oblique angle (non-parallel and non-perpendicular) relative to the other longitudinal axis 104. In at least one example, the longitudinal axes 104 of the pair of elongate clamps can be oriented in a substantially V-shaped arrangement. In at least one example, the angle formed by the longitudinal axes 104 can be an acute angle. In another example, the acute angle formed by the longitudinal axes 104 can be greater than 10 degrees and less than 90 degrees. In another example, the acute angled formed by the longitudinal axes 104 can be less than 45 degrees. In yet another example, the acute angled formed by the longitudinal axes 104 can be greater than 10 degrees and less than 45 degrees. The pair of elongate clamps 110 can be spaced apart, one from another. In another example, the pair of elongate clamps 110 can be abreast of the other. The arrangement of the pair of elongate clamps 110 in a substantially V-shaped arrangement can increase the contact surface area of the upwardly facing engagement portion 112 with the elongate support bar. With the elongate clamps 110 extending crosswise to the support bar of the vehicular rack, an increased contact surface area (compared to a perpendicular orientation of the clamps 110 to the support bar) creates a more secure attachment of the bracket assembly 100 to the bar. The V-shaped arrangement of the elongate clamps 110 further increases the stability of the bicycle carrier on the vehicular mounted roof rack because at least portions of the pair of elongate clamps are spread apart further from one another relative to the length of the support bar.

As may be appreciated in FIG. 3, each of the pair of elongate clamps 110 can have a front end 114 and a backend 116. In at least one example, the front ends 114 of the elongate clamps 110 can be spaced apart from one another at a greater distance than the backends 116 are spaced apart from one another. Similarly, the pair of elongate clamps 110 can be described as tapering toward one another from the front ends 114 of the pair of elongate clamps to the backends 116 of the elongate clamps.

The bracket assembly 100 can further include a bicycle accessory receiving space 118. In one example, the accessory constitutes brake mount extensions that extend below the fork skewer, and when mounted on the fork anchor are located outboard of, and adjacent to the backends 116 of the pair of elongate clamps 110. In at least one example, the bracket assembly 100 can include a pair of brake receiving spaces 118 located outboard of, and adjacent to the backends 116 of the pair of elongate clamps 110.

Figure 4:
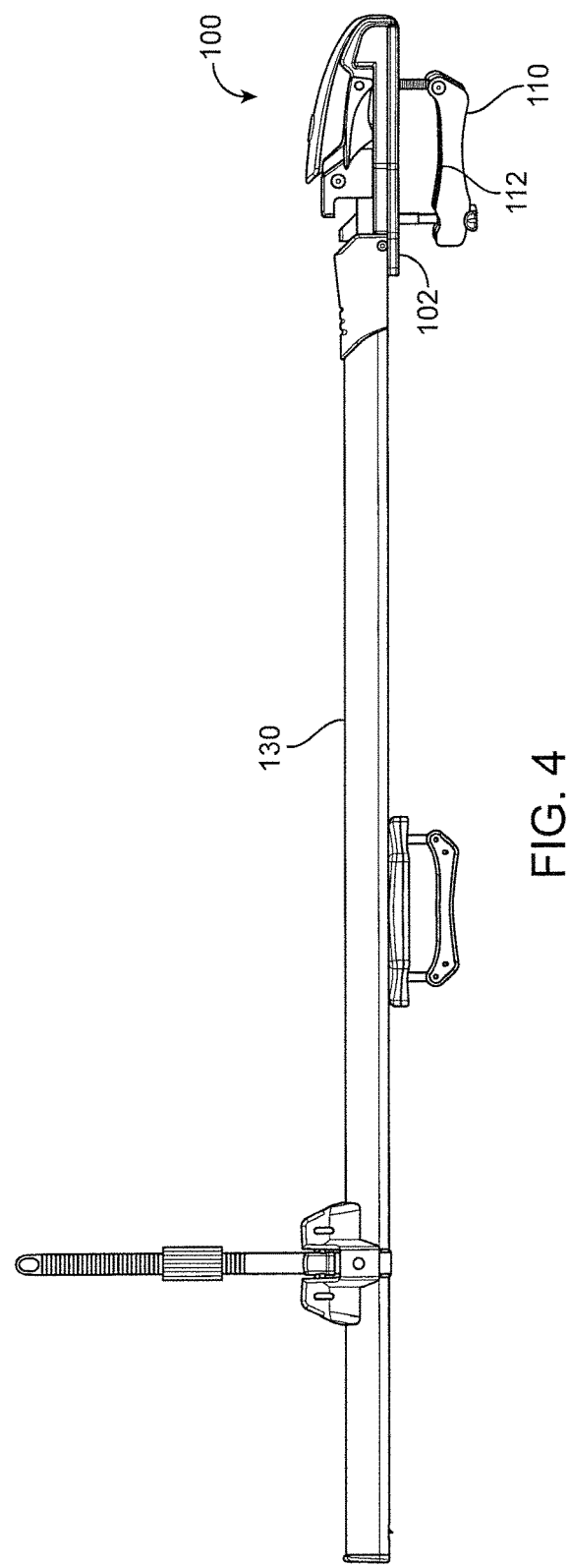
FIG. 4 is a side elevational view of an example embodiment of the bicycle carrier of FIG. 1.
Figure 5:
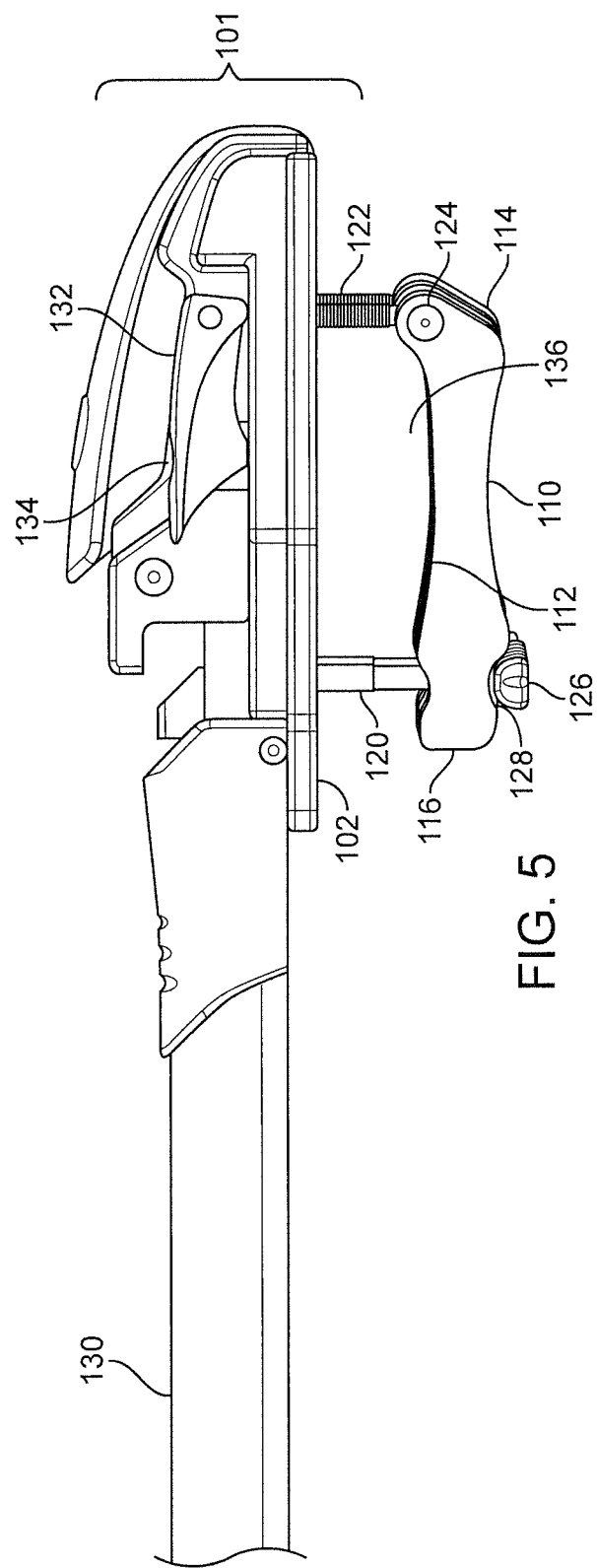
FIG. 5 is an enlarged side elevational view of the bicycle fork anchor and bracket assembly of FIG. 4.
Figure 6:
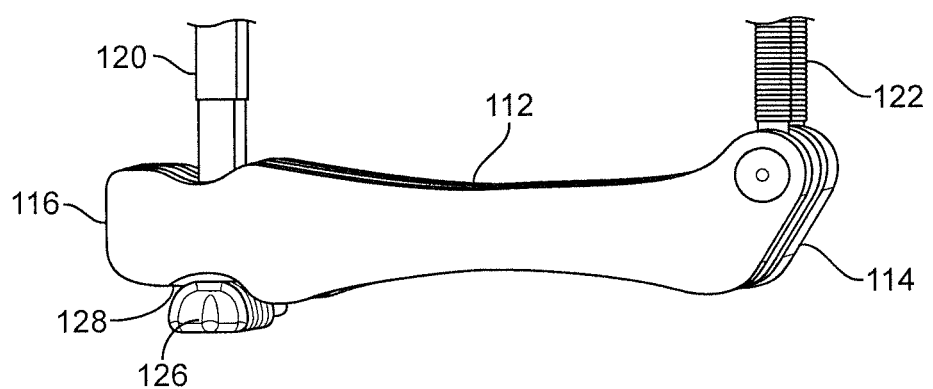
FIG. 6 is an side isometric view of an example embodiment of a pair of elongate clamps depicted in FIGS. 1-5.

FIGS. 4-6 illustrate a side view of an example embodiment of the vehicular roof rack mounting bracket having a pair of elongate clamps. The bracket assembly can further include a pair of anchor posts 120, a pair of securement posts 122, and a pair of clamp couplers 124. Each of the anchor posts 120 can include a turn handle 126 configured to operably release the pair of elongate clamps 110. Each of the pair of elongate clamps 110 can have a turn handle receiving portion 128 configured to receive the turn handle 126 when in the elongate clamp 110 is in an engaged configuration. In at least one example, the turn handle 126 is a twist knob that is engaged when substantially perpendicular to the longitudinal axis 104 of each elongate clamp 110 and released when substantially parallel to the longitudinal axis 104 of each the elongate clamp 110. In another example, each turn handle 126 can be a twist knob with threadable engagement with the anchor post 120. The turn handle can have a threaded receiving portion configured to threadably engage with a threaded end portion of the anchor post 120. Alternatively, the turn handles can simply be drop-out-bars received in the recess of the turn handle receiving portion 128.

The upwardly facing engagement portion 112 (shown in FIG. 1) of the pair of elongate clamps 110, the pair of anchor posts 120, the pair of securement posts 122, and the downwardly facing engagement portion 102 of the anchor body 101 collectively form a support bar receiving space 136. In at least one example, the support bar receiving space 136 constricts to clamp about the elongate support bar.

The elongate clamps 110 can be coupled to the securement post via a pair of clamp couplers 124. Each clamp coupler 124 can be configured to rotatably couple the securing post with a respective elongate clamp 110. As discussed above, the turn handle 126 can be configured to disengage, in combination with the locking handle 132, the elongate clamp 110 from the elongate support bar (not shown). After disengagement, each elongate clamp 110 can pivot downwardly about the clamp coupler 124 and thus release the elongate support bar. The elongate clamp 110 can be reengaged by pivoting upwardly to engage the anchor post 120 and securing the turn handle 126 into the turn handle receiving portion 128. In another example, the clamp coupler 124 can have a threaded engagement.

Figure 7:
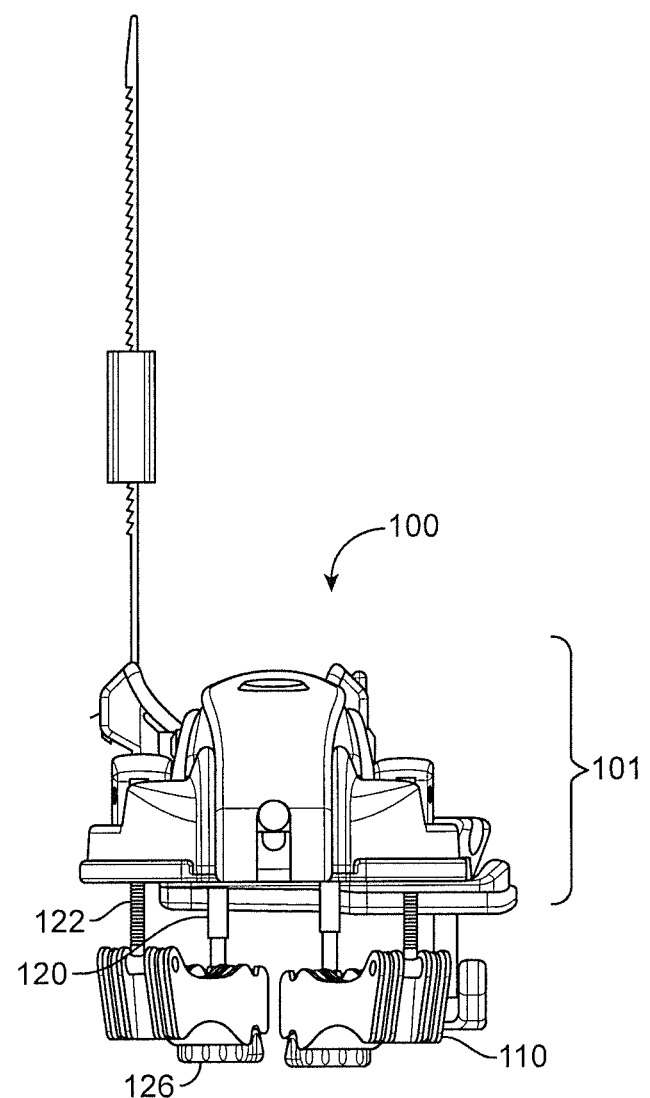
FIG. 7 is a front elevational view of the bicycle carrier of FIG. 1.

FIG. 7 is a front view of an example embodiment of the vehicular roof rack bracket assembly that includes two elongate clamps. As illustrated, the elongate clamps 110 can have a substantially V-shaped arrangement. The substantially V-shaped arrangement increases the contact surface area between the elongate support bar and the downwardly facing engagement portion 102 of the anchor body and the upwardly facing engagement portion 112 of the pair of elongate clamps 110. The substantially V-shaped arrangement causes the bracket assembly 100 to taper from front to back. The tapering of the bracket assembly 100 can create a brake receiving space 118. The bracket assembly 100 can have a brake receiving space 118 outboard of, and adjacent to the backends of the pair of elongate clamps 110. The substantially V-shaped arrangement creates a stable vehicular mounting arrangement while allowing the bracket assembly 100 to accommodate bicycles requiring the brake receiving space 118.

While the discussed examples and embodiments reference sports equipment carriers for bicycles, the vehicular roof rack bracket assembly 100 can be implemented with other sporting equipment carriers such as carriers configured to transport bicycles, skis, cargo containers, and other objects to be placed on a roof of a vehicle.

Example implementations have been described hereinabove regarding various example embodiments. The example embodiments are intended to constituted non-limiting examples. The subject matter that is intended to be within this disclosure is set forth in the following claims.

What is claimed is:

1. A bracket assembly for securing a bicycle anchor of a bicycle carrier to an elongate support bar of a vehicular roof rack, the bracket comprising:
   a pair of elongate clamps configured to be coupled to a bicycle anchor of a bicycle carrier, each clamp having a first end, a second end, and a bar engagement portion configured to abut an exterior of an elongate support bar of a vehicular roof rack in a secured configuration in which each clamp is fastened to the support bar,
   wherein each clamp has a lengthwise oriented longitudinal axis and each longitudinal axis is oriented at an oblique angle relative to the lengthwise oriented longitudinal axis of the bicycle carrier, such that a distance between the first ends is greater than a distance between the second ends.

2. The bracket assembly of claim 1, wherein the longitudinal axes of the pair of elongate clamps are oriented in a V-shape.

3. The bracket assembly of claim 2, wherein the angle between the longitudinal axes of the pair of elongate clamps is an acute angle.

4. The bracket assembly of claim 3, wherein the acute angle between the longitudinal axes of the pair of elongate clamps is less than 45 degrees.

5. The bracket assembly of claim 4, wherein the acute angle between the longitudinal axes of the pair of elongate clamps is greater than 10 degrees.

6. The bracket assembly of claim 3, wherein the acute angle between the longitudinal axes of the pair of elongate clamps is greater than 10 degrees.

7. The bracket assembly of claim 2, wherein each one of the pair of elongate clamps is spaced apart, one from the other.

8. The bracket assembly of claim 7, wherein each one of the pair of elongate clamps is positioned abreast of the other.

9. The bracket assembly of claim 8, wherein each one of the pair of elongate clamps has a front end and a backend, and wherein the front ends of the pair of elongate clamps are spaced apart from one another at a greater distance than the backends are spaced apart from one another.

10. The bracket assembly of claim 8, wherein each one of the pair of elongate clamps has a front end and a backend, and wherein the pair of elongate clamps taper toward one another from the front ends of the pair of elongate clamps to the backends of the pair of elongate clamps.

11. The bracket assembly of claim 10, further comprising a bicycle accessory receiving space located outboard of and adjacent to the backends of the pair of elongate clamps.

12. The bracket assembly of claim 10, further comprising a pair of brake receiving spaces, each located outboard of and adjacent to opposite sides of the backends of the pair of elongate clamps.

13. The bracket assembly of claim 1, wherein the bar engagement portion comprises a turn handle configured to operably release the pair of elongate clamps.

14. The bracket assembly of claim 13, wherein the turn handle is engaged when perpendicular to the lengthwise oriented longitudinal axis of each elongate clamp and released when parallel to the lengthwise oriented longitudinal axis of each elongate clamp.

15. A bicycle fork anchor of a bicycle carrier securable to an elongate support bar of a vehicular roof rack, the fork anchor comprising:
an anchor body of a bicycle carrier;
a pair of elongate clamps coupled to the anchor body, each clamp having an upwardly facing bar engagement portion configured to abut an exterior of an elongate support bar of a vehicular roof rack in a secured configuration in which each clamp is fastened to the support bar,
wherein each one of the pair of clamps has a lengthwise oriented longitudinal axis and each longitudinal axis is oriented at an oblique angle relative to a lengthwise oriented longitudinal axis of the bicycle carrier.

16. The bicycle fork anchor of claim 15, wherein the anchor body further comprises a downwardly facing bar engagement portion configured to abut the exterior of the elongate support bar of the vehicular roof rack in the secured configuration in which each clamp is fastened to the support bar.

17. The bicycle fork anchor of claim 16, wherein the longitudinal axes of the pair of elongate clamps are oriented in a V-shape.

18. The bicycle fork anchor of claim 17, wherein the angle between the longitudinal axes of the pair of elongate clamps is an acute angle.

19. The bicycle fork anchor of claim 18, wherein the acute angle between the longitudinal axes of the pair of elongate clamps is less than 45 degrees.

20. The bicycle fork anchor of claim 19, wherein the acute angle between the longitudinal axes of the pair of elongate clamps is greater than 10 degrees.

21. The bicycle fork anchor of claim 18, wherein the acute angle between the longitudinal axes of the pair of elongate clamps is greater than 10 degrees.

22. The bicycle fork anchor of claim 17, wherein each one of the pair of elongate clamps is spaced apart, one from the other.

23. The bicycle fork anchor of claim 22, wherein each one of the pair of elongate clamps is positioned abreast of the other.

24. The bicycle fork anchor of claim 23, wherein each one of the pair of elongate clamps has a front end and a backend, and wherein the front ends of the pair of elongate clamps are spaced apart from one another at a greater distance than the backends are spaced apart from one another.

25. The bicycle fork anchor of claim 23, wherein each one of the pair of elongate clamps has a front end and a backend, and wherein the pair of elongate clamps taper toward one another from the front ends of the pair of elongate clamps to the backends of the pair of elongate clamps.

26. The bicycle fork anchor of claim 25, further comprising a brake receiving space located outboard of and adjacent to the backends of the pair of elongate clamps.

27. The bicycle fork anchor of claim 25, further comprising a pair of brake receiving spaces, each one located outboard of and adjacent to opposite sides of the backends of the pair of elongate clamps.

28. The bicycle fork anchor of claim 15, wherein each of the pair of elongate clamps is located entirely beneath the anchor body in the secured configuration.

29. A bracket assembly for securing at least part of a sports equipment load carrier to an elongate support bar of a vehicular roof rack, the bracket assembly comprising:
a pair of elongate clamps configured to be coupled to a part of a sports equipment load carrier, each clamp having a bar engagement portion configured to abut an exterior of an elongate support bar of a vehicular roof rack in a secured configuration in which each clamp is fastened to the support bar,
wherein each one of the pair of clamps has a lengthwise oriented longitudinal axis and each longitudinal axis is oriented at an oblique angle relative to the other longitudinal axis,
wherein the lengthwise oriented longitudinal axes are in a common plane.

30. The bracket assembly of claim 29, wherein the longitudinal axes of the pair of elongate clamps are oriented in a V-shape.

31. The bracket assembly of claim 30, wherein the angle between the longitudinal axes of the pair of elongate clamps is an acute angle.

* * * * *